(12) United States Patent
Thebrin et al.

(10) Patent No.: US 6,228,223 B1
(45) Date of Patent: May 8, 2001

(54) COMPOSITION FOR TREATMENT OF CELLULOSIC MATERIAL

(75) Inventors: Ingemar Thebrin; Lisbeth Ankarbratt, both of Stenungsund (SE)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/126,247

(22) Filed: Jul. 30, 1998

(30) Foreign Application Priority Data

Aug. 6, 1997 (EP) .................................................. 97850120

(51) Int. Cl.$^7$ ............................................... D21H 11/00
(52) U.S. Cl. ....................... 162/504; 162/163; 162/164.4; 162/164.7; 162/167; 162/168.1; 510/504; 510/524; 510/525; 510/526
(58) Field of Search .......................... 162/158, 163, 162/164.6, 164.7, 167, 168.1; 510/504, 524–526

(56) References Cited

U.S. PATENT DOCUMENTS

| | | | |
|---|---|---|---|
| 4,144,122 | 3/1979 | Emanuelsson et al. ............. | 162/158 |
| 4,303,471 | 12/1981 | Laursen ................. | 162/158 |
| 4,351,699 | 9/1982 | Osborn, III .......... | 162/112 |
| 4,441,962 | 4/1984 | Osborn, III .......... | 162/111 |
| 4,476,323 | 10/1984 | Hellsten et al. ..... | 564/294 |
| 4,559,150 | * 12/1985 | Becker et al. ........ | 252/8.6 |
| 4,790,856 | 12/1988 | Wixon .................. | 8/137 |
| 5,066,414 | 11/1991 | Chang ................. | 252/8.8 |
| 5,312,522 | 5/1994 | Van Phan et al. ..... | 162/111 |
| 5,591,708 | 1/1997 | Richter .................. | 510/463 |
| 5,674,832 | * 10/1997 | Keys ..................... | 510/504 |
| 5,925,615 | * 7/1999 | Kern et al. ............ | 510/463 |

FOREIGN PATENT DOCUMENTS

| | | | |
|---|---|---|---|
| 998521 | 1/1962 | (GB) . | |
| 1107372 | 6/1965 | (GB) | ............................ D06M/13/00 |
| 1069369 | 9/1965 | (GB) | ............................ C08B/39/04 |
| 2 211 510 | 7/1989 | (GB) | ............................ C11D/11/825 |
| WO 95/34716 | 12/1985 | (WO) | ............................ D21H/17/07 |
| WO 93/21382 | 10/1993 | (WO) | ............................ D21H/17/06 |
| WO93/21383 | 10/1993 | (WO) | ............................ D21H/17/06 |
| WO 94/26974 | 11/1994 | (WO) | ............................ D21H/21/24 |
| WO 97/04170 | 2/1997 | (WO) | ............................ D21H/21/22 |

* cited by examiner

*Primary Examiner*—Stanley S. Silverman
*Assistant Examiner*—Mark Halpern
(74) *Attorney, Agent, or Firm*—Lainie E. Parker

(57) ABSTRACT

The present invention generally relates to an aqueous softening and antistatic agent composition comprising a quaternary ammounium compound and a biodegradable nonionic surfactant, which composition comprises a quaternary ammounium compound having the formula

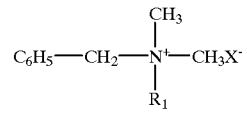

wherein $R_1$ is a $C_6$–$C_{22}$ hydrocarbyl group; and X is halogen or $SO_4^{2-}$, in a concentration of at least about 15% by weight. The surfactant is a linear alkoxylated fatty acid or a linear alkoxylated unsaturated alcohol. Furthermore a method for providing cellulosic materials with a reduced tendency to retain an electrostatic charge as well as providing said material with improved softness, wherein the cellulosic material is treated with said composition, and fluff obtainable from fluff pulp treated with the composition.

9 Claims, No Drawings

COMPOSITION FOR TREATMENT OF CELLULOSIC MATERIAL

FIELD OF THE INVENTION

The present invention relates to an aqueous softening and antistatic agent composition, which is useful for the treatment of cellulosic material, in particular fluff pulp, fluff, and tissue. Said composition comprises a quaternary ammonium compound and an alkoxylated fatty acid or an alkoxylated fatty alcohol. Furthermore the invention also relates to a method for providing cellulosic materials with a reduced tendency to retain an electrostatic charge as well as providing the material with improved softness, wherein the material is treated with said composition.

Softening and antistatic agents are frequently used in the production of fluff and tissue.

EP-A-765,418, for instance, relates to a method for the production of fluff pulp in which an antistatic agent composition comprising quaternary ammonium compounds is used; the composition is however not indicated to have any softening properties.

On the other hand WO 97/04170 discloses a tissue containing a softening composition comprising quaternary ammonium compounds and fatty acid alkoxylate or ethoxylated glycerine or lanolin, which is not indicated to have any antistatic properties.

U.S. Pat. No. 4,476,323, however, discloses a composition which is used in a process for the treatment of cellulosic materials to impart a reduced tendency to retain an electrostatic charge and improved softness and/or reduced mechanical strength due to the reduction in interfiber bonding. The composition contains certain quaternary ammonium compounds which comprises in particular a 2-hydroxy-oxypropylene group, which is believed to provide the combined antistatic and softening properties. Apart from this, the composition may contain nonionic surfactants, such as alkoxylated aliphatic alcohols or acids. There is no suggestion given about the compositions biodegradability.

U.S. Pat. No. 5,312,522 discloses however a biodegradable softening composition used in paper products such as tissue. The composition contains certain quaternary ammonium compounds, namely mono- and diester variations of some common quaternary ammonium salts, which esters are said to be biodegradable, in contrast to the corresponding salts; the esters are also said to function as debonding agents. Optionally, the composition may also contain nonionic surfactants such as alkylpolyethoxylated esters. No indication is given about any antistatic properties of the composition.

It would be—particularly in view of the documents referred to above—desirable to be able to provide a softening and antistatic agent composition useful for the treatment of cellulosic material, which composition is biodegradable. Thus, the problem to be solved by the present invention is to provide such a composition.

SUMMARY OF THE INVENTION

The present invention relates to an aqueous softening and antistatic agent composition, which is useful for the treatment of cellulosic material, in particular fluff pulp, fluff, and tissue. Said composition comprises a quaternary ammonium compound and an alkoxylated fatty acid or an alkoxylated fatty alcohol. Furthermore the invention also relates to a method for providing cellulosic materials with a reduced tendency to retain an electrostatic charge as well as providing the material with improved softness, wherein the material is treated with said composition.

DETAILED DESCRIPTION OF THE INVENTION

In view of what is stated in U.S. Pat. No. 5,312,522 about the biodegradability of common quaternary ammonium salts, the problem has now surprisingly been solved by the claimed invention. In more detail the present composition is an aqueous softening and antistatic agent composition comprising a biodegradable nonionic surfactant and a quaternary ammonium compound having the formula

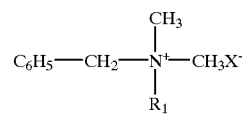

wherein $R_1$ is a $C_6$–$C_{22}$ hydrocarbyl group; and X is halogen or $SO_4^{2-}$, the concentration of the quaternary ammonium compound in the composition being at least about 15% by weight, preferably at least about 20% by weight. The quaternary ammonium compound may, for instance, be chosen among $C_{12}$–$C_{16}$ alkyldimethyl-benzylammonium salts and benzylcocoalkyldimethyl-ammonium salts. In a preferred embodiment of the invention the quaternary ammonium compound is a benzyl-cocoalkyldimethyl-ammonium salt. The anion of the salt may be chosen among the halogen ions, particularly the chloride and bromide ions, and the sulphate ion, although in the preferred case it is a chloride ion; the Chemical Abstracts Service Registry Number of this preferred substance is 61789-71-7. The cocoalkyl group comprises even-numbered, aliphatic, straight-chained $C_8$–$C_{18}$ hydrocarbyl groups. In a preferred embodiment each one of the $C_8$–$C_{18}$ hydrocarbyl groups in the cocoalkyl group represents at least about 2 mole-%, calculated on the total number of moles of said hydrocarbyl groups chains in said cocoalkyl group. The preferred mole percentage ranges of the hydrocarbyl groups in the cocoalkyl group are indicated in Table I below

TABLE I

| HYDROCARBYL GROUP | MOLE PERCENTAGE RANGE |
|---|---|
| $C_8$ | 2–7% |
| $C_{10}$ | 2–7% |
| $C_{12}$ | 45–55% |
| $C_{14}$ | 15–25% |
| $C_{16}$ | 4–14% |
| $C_{18}$ | 4–14% |

The biodegradable nonionic surfactant is a linear alkoxylated fatty acid or a linear unsaturated alkoxylated fatty alcohol. In the present application "alkoxylated" signifies that the compound is obtainable (although it may be obtained in alternative ways using alternative starting substances) from a reaction between a fatty acid or fatty alcohol and an alkylene oxide, such as for instance—but not restricted to—ethylene oxide or propylene oxide. Preferably, the alkoxylated fatty acid is unsaturated. In a preferred embodiment the alkoxylated unsaturated fatty alcohol is derived from unsaturated $C_{10}$–$C_{20}$ alcohols containing one or two double bonds. The unsaturation has a positive impact on the wettability of the treated cellulosic material. In a particularly preferred embodiment the alkoxylated unsaturated fatty alcohol is ethoxylated oleyl cetylalcohol obtainable from an adduction reaction between ethylene oxide and oleyl cetylalcohol in a molar relation of up to about 15 moles of ethylene oxide to about 1 mole of oleyl cetylalcohol, preferably between about 4–6 moles of ethylene oxide to about 1 mole of oleyl cetylalcohol. It is particularly preferred that the surfactant is obtainable from an adduction reaction between 5 ethylene oxide and 1 mole of oleyl cetylalcohol. This preferred surfactant has Chemical Abstracts Service Registry Number 68155-01-1. Again, the term "obtainable" indicates that the ethoxylated oleyl cetylalcohol may be obtained by alternative reaction routes.

Apart from the active substances discussed above the composition may contain various additives, for instance solution viscosity reducing additives such as suitable glycols, e.g. ethylene glycol or propylene glycol, ethanol, or the ethyl ether of diethylene glycol.

As indicated above the present invention also relates to a method for antistatic and softening treatment of cellulosic materials in which the present aqueous softening and antistatic agent composition is used. The cellulosic material may for instance be pulp, such as mechanical pulp (MP), stone groundwood pulp (SGW), pressure groundwood pulp (PGW), refiner mechanical pulp (RMP), thermo-mechanical pulp (TMP), chemi-mechanical pulp (CMP), or chemi-thermomechanical pulp (CTMP). In a preferred embodiment the cellulosic material is fluff pulp, i.e. pulp intended for dry shredding to yield fluff. The cellulosic material may also be fluff or tissue. The present method may be used for the production of a number of cellulosic products the softness of which is of great importance, such as toilet paper, hygienic tissues, tissue paper, paper sheets, paper fabrics, paper towels, paper tablecloths, and paper clothing.

At said treatment the present composition may be added to cellulose material suspended in water, for instance in the stock of a pulp production process prior to the forming of the pulp sheet. The amount of the present composition in the stock is suitably up to about 10 kg/ton of dry pulp, preferably up to about 5 kg/ton. Alteratively, the composition—optionally diluted with water to a concentration of about 2–5 grams per liter of water—may be sprayed on dry cellulosic material, e.g. on dry fluff pulp or dry tissue.

The present invention will now be illustrated by means of a non-limiting example.

EXAMPLE

A composition according to the present invention was prepared, containing the substances set forth in Table II below, and in the respective percentages indicated therein.

TABLE II

| | |
|---|---|
| benzyl-cocoalkyldimethyl-ammonium chloride | about 20 weight-% |
| oleyl cetylalcohol ethoxylated with 5 ethylene oxide units | about 75 weight-% |
| water | about 2.5 weight-% |
| propylene glycol | about 2.5 weight-% |

A reference composition was also prepared, containing the substances set forth in Table III below, also in the percentages indicated therein.

TABLE III

| | |
|---|---|
| benzyl-cocoalkyldimethyl-ammonium chloride | about 12.5 weight-% |
| water | about 87.5 weight-% |

Both compositions were added to different samples of a 2% sulphate pulp slurry in amounts of 2 and 4 kg/ton dry pulp. Sheets were formed from the pulp slurries, and after drying the sheets were tested with respect to softness (the burst factor, measured according to SCAN-P 24:77 and indicated as percent of a blank test, and the tear energy in kJ/kg); and to the static potential in kV.

The obtained results are set forth in Table IV below.

TABLE IV

| | Kg composition per ton of dry pulp | Reference composition | Composition according to the invention |
|---|---|---|---|
| Burst factor | 2 | 100 | 73 |
| | 4 | 100 | 41 |
| Tear energy, kJ/kg | 0 | 160 | 160 |
| | 2 | 156 | 119 |
| | 4 | 160 | 69 |
| Static potential, kV | 0 | 10 | 10 |
| | 2 | 1 | 4 |
| | 4 | −2 | 0 |

The tear energy and the static potential were measured by means of a method in which conditioned pulp sheets are cut into 30×210 mm strips, weighed, and placed in the feeding chute of Laboratory Pin Fibrizer (sold by Stora Kopparberg, Corporate Research Center, Falun, Sweden), equipped with an electronic display indicating the energy required for the fibration of the sheet, and the main and the feeding motors are started. A predetermined length of the strip is defibred by the rotating fibrizer's pin cylinder, after which the feeding motor is reversed to remove the undefibred part of the sheet. The remaining part of the sheet is weighed, and from this the defibred amount of sheet may be derived. The ratio between the energy reading on the display and said defibred amount is the tear energy, measured in kJ/kg. An electrostatic voltmeter (JCI 148 from John Chubb Instrumentation) is used to measure the static potential of the defibred amount of sheet.

As can be seen the present composition has, in contrast to the reference composition, a clear effect with regard to all of the parameters listed in Table IV, in particular a clearly improved impact on the softness parameters.

We claim:

1. An aqueous softening and antistatic agent composition comprising at least about 15% by weight of a quaternary ammonium compound and a biodegradable nonionic surfactant, wherein said quaternary ammounium compound has the formula

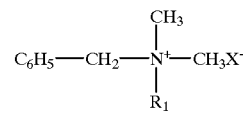

wherein $R_1$ is a $C_6$–$C_{22}$ hydrocarbyl group; and X is halogen or $SO_4^{2-}$, and the surfactant is a linear alkoxylated unsaturated fatty acid or a linear alkoxylated unsaturated fatty alcohol.

2. The composition of claim 1 wherein the quaternary ammounium compound is a benzyl-cocoalkyldimethyl-ammonium salt.

3. The composition of claim 2 wherein the concentration of said salt is at least about 20% by weight.

4. The composition of claim 1 wherein said biodegradable nonionic surfactant is an alkoxylated oleyl cetylalcohol.

5. The composition of claim 1 wherein said biodegradable nonionic surfactant is an ethoxylated oleyl cetylalcohol.

6. The composition of claim 5 wherein said ethoxylated oleyl cetylalcohol is obtainable by reacting ethylene oxide with oleyl cetylalcohol in a molar relation of up to about 15 moles of ethylene oxide to about 1 mole of oleyl cetylalcohol.

7. The composition of claim 6 wherein the molar relation is between about 4-6 moles of ethylene oxide to about 1 mole of oleyl cetylalcohol.

8. The composition of claim 2 wherein the cocoalkyl group of the quaternary ammonium compound comprises $C_8$–$C_{18}$ hydrocarbyl groups wherein each one of the $C_8$–$C_{18}$ hydrocarbyl groups represents at least about 2 mole %, calculated on the total number of moles of said hydrocarbyl groups in said cocoalkyl group.

9. The composition of claim 1 wherein the linear alkoxylated unsaturated fatty alcohol is derived from unsaturated $C_{10}$–$C_{20}$ alcohols containing one or two double bonds.

* * * * *